INVENTOR.
RICHARD H. SMITH
By Beehler & Arant
ATTORNEYS.

Jan. 19, 1971 R. H. SMITH 3,555,835
SUSPENDED PIPE LAYING STINGER FOR LAYING
PIPELINES IN UNLIMITED DEPTHS OF WATER
Filed Aug. 16, 1968 3 Sheets-Sheet 3

INVENTOR.
RICHARD H. SMITH
By Beehler & Orant
ATTORNEYS

United States Patent Office 3,555,835
Patented Jan. 19, 1971

3,555,835
SUSPENDED PIPE LAYING STINGER FOR
LAYING PIPELINES IN UNLIMITED DEPTHS
OF WATER
Richard H. Smith, Huntington Beach, Calif., assignor to
Healy Tibbitts Construction Co., Long Beach, Calif.,
a corporation of California
Filed Aug. 16, 1968, Ser. No. 753,144
Int. Cl. F16l 1/00; B63b 35/04
U.S. Cl. 61—72.3               5 Claims

ABSTRACT OF THE DISCLOSURE

A suspended pipe laying system for laying a continuous jointed pipeline on the bottom of a body of relatively deep water which consists of a plurality of separate shoes jointed together by means of connections which can be adjusted by a power means from the surface so that the shoes can be set in a selected angular relationship whereby all of the shoes acting together establish an arc which extends from a location adjacent the bottom to a location adjacent the floating station from which successive lengths of pipe are joined together to make the pipeline. Movable guides are provided on the shoes so that the pipe, when it is fed downwardly from the floating station, is fed in an arc which does not overstress or damage the pipelines during the course of laying.

---

For various reasons it becomes necessary on occasions to lay jointed pipe on the ocean floor at relatively great depths. Such depths may vary from 200 feet or so to depths as much 2,000 feet and sometimes deeper. One of the more common uses of pipelines is for passing petroleum from deep water wells to the shore. Such pipelines usually consist of a series of conventional lengths of iron pipe with threaded or welded joints. They are connected by some appropriate means to the source from which liquid is to be conducted and then laid progressively from the source to the shore. On some occasions, the process may be reversed and the pipeline laid from the shore progressively out into deeper water to the source. Such installations are cited merely by way of example to illustrate the problem to which the suspended pipe laying system herein disclosed may be applied.

Inasmuch as the pipe laying often needs to be done at depths for deeper than divers can work and since there is always present the need for avoiding overstressing or damaging the pipe while it is being laid, especially at the joints, it is extremely necessary to be certain that no leaks are created in the pipe during the laying process and naturally that no leaks result in the pipeline after it has been laid.

It is therefore among the objects of the invention to provide a new and improved suspended pipe laying system for laying pipelines in relatively deep water whereby jointed lengths of pipe are carefully guided from a station on the surface from which the pipeline is fed downwardly to the ocean bottom.

Another object of the invention is to provide a new and improved suspended pipe laying system for laying a pipeline in relatively deep water whereby guides for determining the curvature of the pipeline as it is passed from a vertical position at the surface to a horizontal or relatively horizontal position at the bottom can be set, depending upon the pipe diameter and the material from which it is constructed, so that the curvature will never be so sharp that it generates undesired stressing in the pipe while it is being laid.

Still another object of the invention is to provide a new and improved suspended pipe laying system for laying of jointed pipelines in relatively deep water which consists of a series of jointed shoes or stingers capable of being set at a desired angular relationship with respect to each other, thereby to establish the curvature of the pipeline while it is being laid, there being provided guides, observation means, and adjustment means, such that the degree of curvature can be set at any time and readjusted at any time so as to accommodate the pipeline to the condition of the bottom at different depths in a manner such that likelihood of overstressing is minimized, and also such that should inadvertent overstressing occur during the laying process, it can be immediately detected.

With these and other objects in view, the invention consists in the construction, arrangement, and combination of the various parts of the device, whereby the objects contemplated are attained, as hereinafter set forth, pointed out in the appended claims and illustrated in the accompanying drawings.

Figure 1:
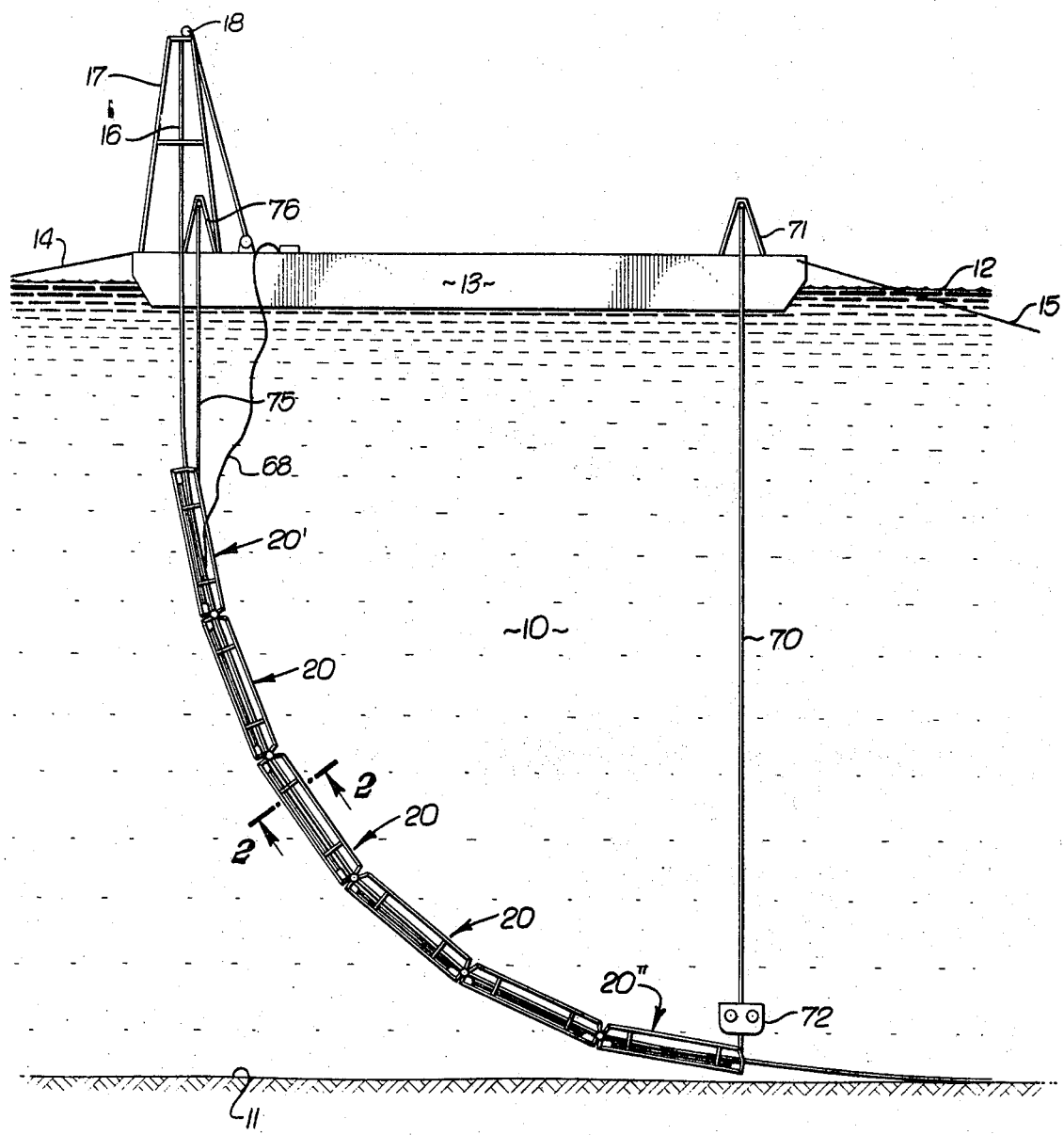
FIG. 1 is a schematic view showing the system in operation in relatively deep water for a pipe of selected diameter.

In an embodiment of the invention chosen for the purpose of illustration there is shown a body of water indicated generally by the reference character 10 which may, for example, be open ocean which varies in depth from the shore outwardly, the bottom being indicated by the reference character 11 and the surface by the reference character 12. A barge 13 comprising a station from which pipe is laid floats upon the surface 12 over which it may be progressively shifted as to location by cables 14 and 15 attached to appropriate anchors (not shown), or for example by power propulsion (not shown). The barge may be loaded with pipe sufficient for laying an appreciable length of the pipeline. Standard lengths of pipe are adapted to be lifted into place vertically by making use of a tower 17 at the bow or leading end of the barge 13 equipped with a suitable hoist 18. Details of the hoist for lifting lengths of pipe 16 up to a vertical position have not been shown inasmuch as they are substantially conventional in construction and operation.

Shoes or stingers have been indicated by the reference character 20, the uppermost shoe being given the reference character 20', and the lowermost shoe the reference character 20''. The number of shoes employed in the string will depend upon the curvature needed for pipe of some selected diameter and the depth at which the pipe will be laid on the bottom 11. The shoes are identical in form and construction, and arranged such that they are connected end to end by an articulated joint such as that shown in FIGS. 3 and 5, there being a joint at each end so that any number of shoes may be joined together in a string.

Each shoe consists of a frame 21 comprising a pair of upper longitudinally extending tubes 22 and 23 joined to a pair of lower longitudinally extending tubes 24 and 25 by appropriate upper bars 26 and 27 at each end joined to respective appropriate lower bars 28 and 29 at each end. There is provided a split bushing consisting of twin parts 30, 30' integral with the upper and lower bars 26, 28 at one end of the shoe and an intermediate bushing 31 integral with the upper and lower bars 27, 29 of the adjoining end of the next adjacent shoe, whereby adjoining ends of adjacent shoes can be pivotally secured together by appropriate chord pivot pins 32 and 33.

Figure 3:
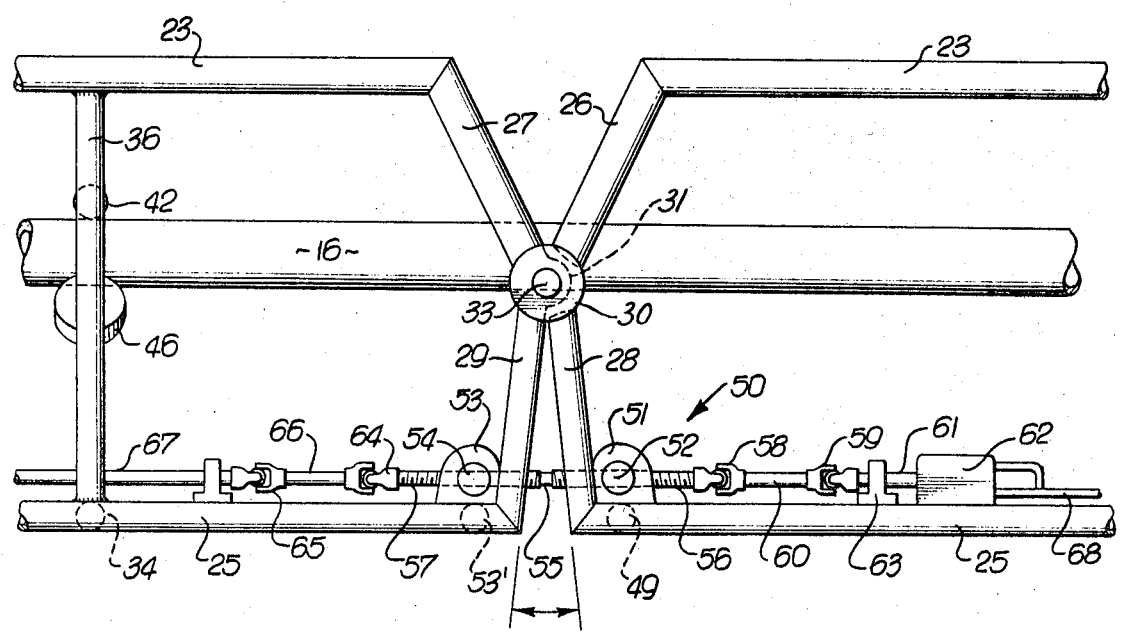
FIG. 3 is a fragmentary longitudinal view of a joint between adjoining ends of adjacent shoes.

Opposite sides are connected together by a series of cross bars 34, FIG. 3, made rigid by employment of a truss consisting of diagonal braces 35 and 36, the upper ends of which are attached to the respective tubes 22 and 23, as the case may be, and the lower ends attached to the cross bar 34, as for example by welding.

Figure 2:
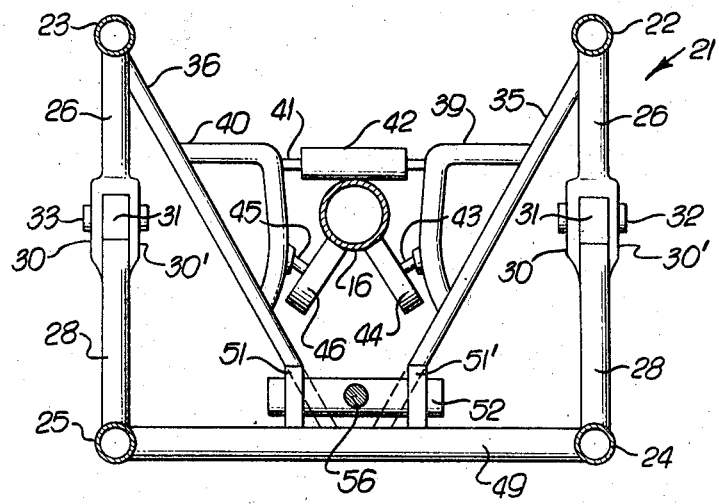
FIG. 2 is a cross-sectional view of one of the shoes taken on the line 2—2 of FIG. 1.
Figure 5:
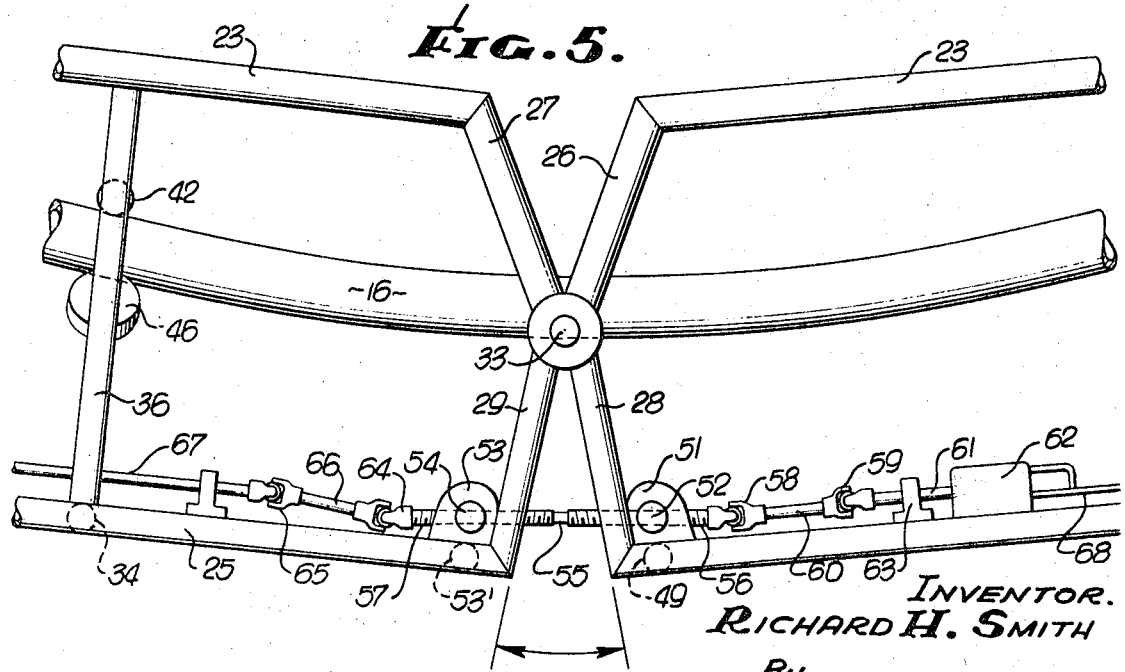
FIG. 5 is a view similar to FIG. 3 but showing adjacent shoes set at a different angular relationship with respect to each other.

A bracket 39 mounted upon the diagonal brace 35 is located in a position cooperating with a bracket 40 on the diagonal brace 36 so that the brackets 39 and 40 are opposite from each other. A roller shaft 41 extends between upper ends of the brackets 39 and 40 rotatably supporting thereon a roller 42. On the lower portion of the bracket 39 is a stub roller shaft 43 supporting a roller 44. A similar stub roller shaft 45 on the lower portion of the bracket 40 supports a roller 46. These rollers bear at three points of contact upon the circumference of a length of pipe 16 as it is contained within and passes through the respective shoe. Thus the pipeline is restrained from lateral movement and held so as to allow the formation of a curvature more easily as seen in FIGS. 1, 2 and 5.

It should be noted particularly that the upper bars 26 and 27 are disposed angularly with respect to each other, and at a greater angular distance of separation than the angular disposition of the lower bars 28 and 29 with respect to each other, so as not to interfere with disposing respectively adjacent shoes to an angular relationship with respect to each other.

In order to set the angular distance at any desired amount there is provided a drive, indicated generally by the reference character 50, which operates between adjoining ends of adjacent shoes. To accommodate the drive there are provided spaced apart gusset bushings 51, 51' located on a cross bar 49. A journal nut 52 is rotatably mounted in the respective gusset bushings and extends from the gusset bushing 51 on one side to the corresponding gusset bushing 51' on the other side. A similar pair of gusset bushings 53 (of which only one is shown in FIGS. 3 and 5) is provided for the adjoining end of the adjacent shoe, the gusset bushings 53 being mounted on a cross bar 53' and supporting a similar journal nut 54.

Extending through the journal nut 52 is a threaded line shaft 55 having one end 56 provided with a right hand thread, for example, and another end 57 provided with a left hand thread, the shaft being in threaded engagement with corresponding threads in the respective journal nuts 52 and 54. Universal joints 58 and 59 interconnect the line shaft 55 through a short shaft 60 to a primary line shaft 61 driven in a rotational direction by an appropriate hydraulic motor 62. A support for the primary line shaft is shown at 63. Similarly, the universal joints 64 and 65 interconnect the line shaft 55 through a short shaft 66 to a secondary line shaft 67. Although in this arrangement it may be understood that the drive 50 between adjoining ends of each pair of adjoining shoes operates from one common source of power, such as the hydraulic motor 62, a comparable hydraulic motor can be provided for each shoe synchronized with a source of hydraulic power. To operate the hydraulic motor 62, for example, there is a hydraulic line 68 which extends upwardly to the barge 13 and which can be adjusted as to length depending upon where the string of shoes is located beneath the barge.

In order to handle a string of shoes, as suggested in FIG. 1, there is provided at the stern of the barge 13 a sling 70 attached to an appropriate hoist 71, the lower end of the sling 70 being connected to one of the lower shoes. In the example shown it is attached to the lowermost shoe 20" at its free end. There may also be provided on the sling 70 an observation bell 72 adapted to move up and down the sling 70 by appropriate conventional means so that it can be lowered when needed to a desired depth to visually inspect the pipe as it emerges from the lowermost shoe 20". The hoist 71 is so mounted that it can be shifted in position to a desired location between the bow and the stern, as may be needed, depending on the location of the connection of the sling to the appropriate shoes. There is also provided a sling 75 at the bow or leading end of the barge 13 an upper end of which is attached to a hoist 76 and a lower end of which is attached to the upper end of the uppermost shoe 20'.

In operation of the system lengths of pipe 16 are joined together by a threaded fastener or welding, as the case may be, beginning at some selected source. The operation is started by floating the assembled stinger made up of the shoes as shown alongside the barge, then a starter section of pipe, somewhat longer than the stinger is inserted into the uppermost shoe and passed through the stinger with the ends of the pipe extending beyond both ends of the stinger. At this point the stinger assembly is curved by setting the hydraulic drives in motion, with the trailing end of the stinger is lowered so that the leading end of the stinger assembly is in a vertical position and the trailing end is in a position roughly parallel with the ocean bottom. In practice a connection would be made from the pipeline to a structure on the bottom or to a pipeline laid by conventional methods. For practical purposes, conventional pipe laying methods are usually economical down to about 250 feet depth where the pipe laying apparatus of the present invention would take over. In any event, where the bottom 11 is at a substantial depth below the surface 12, the pipeline will lie substantially on the bottom astern of the barge and extend upwardly to the barge 13 which serves as a station for lengthening the pipeline section by section. The sling 70 is attached to one of the lowermost shoes 20, or 20", depending upon the radius required, and the sling 75 to the uppermost shoe 20'. Meanwhile, the drives 50 are set in operation by actuation of the hydraulic motor 62 in order thereby to set the curvature of the pipeline between the barge and the bottom. The radius of curvature will vary depending on the diameter of pipe. For example, for pipe of 2 inch diameter the radius of curvature can be 120 feet, whereas for pipe of 12 inch diameter the radius of curvature will be 500 feet. The string of shoes is suspended so that the lowermost shoe 20" is located a few feet above the bottom in an essentially horizontal position and the uppermost shoe 20' in an essentially vertical position by the tower 17.

As new lengths of pipe are added to the pipeline, the position of the barge is progressively shifted, as for example, by drawing upon the anchor cable 14 and paying off on the anchor cable 15. As each length of pipe 16 is joined to the endmost point of the pipeline, the pipeline is slid through the string of shoes rolling over the rollers heretofore described as it passes downwardly from the barge to the bottom. The radius of curvature between pipe lying horizontally on the bottom and lengths of pipe added to the top in a vertical position is set by the drives 50 and held in the desired position. Moreover, as the depth of the bottom below the surface changes, the level of the lowermost shoe 20" can be shifted by adjusting the sling 70. Although this normally mean progressively lowering the bottommost shoe as the barge progresses out into deeper water, occasions could arise, where due to changes in the bottom the shoe would need to be periodically raised. Moreover, on those occasions were a reverse technique is employed, as for example, laying pipe from the deepest point to the shallower point, the string of shoes would be progressively raised except for the accommodation of differences in the bottom contour. Echo sounding equipment is commercially available adapted to read the distance between the bottom 11 and the pipe being laid, whereby the position of the bottommost shoe 20″ can be effectively set at the desired location above the bottom 11 as the pipeline laying system progresses.

Figure 4:
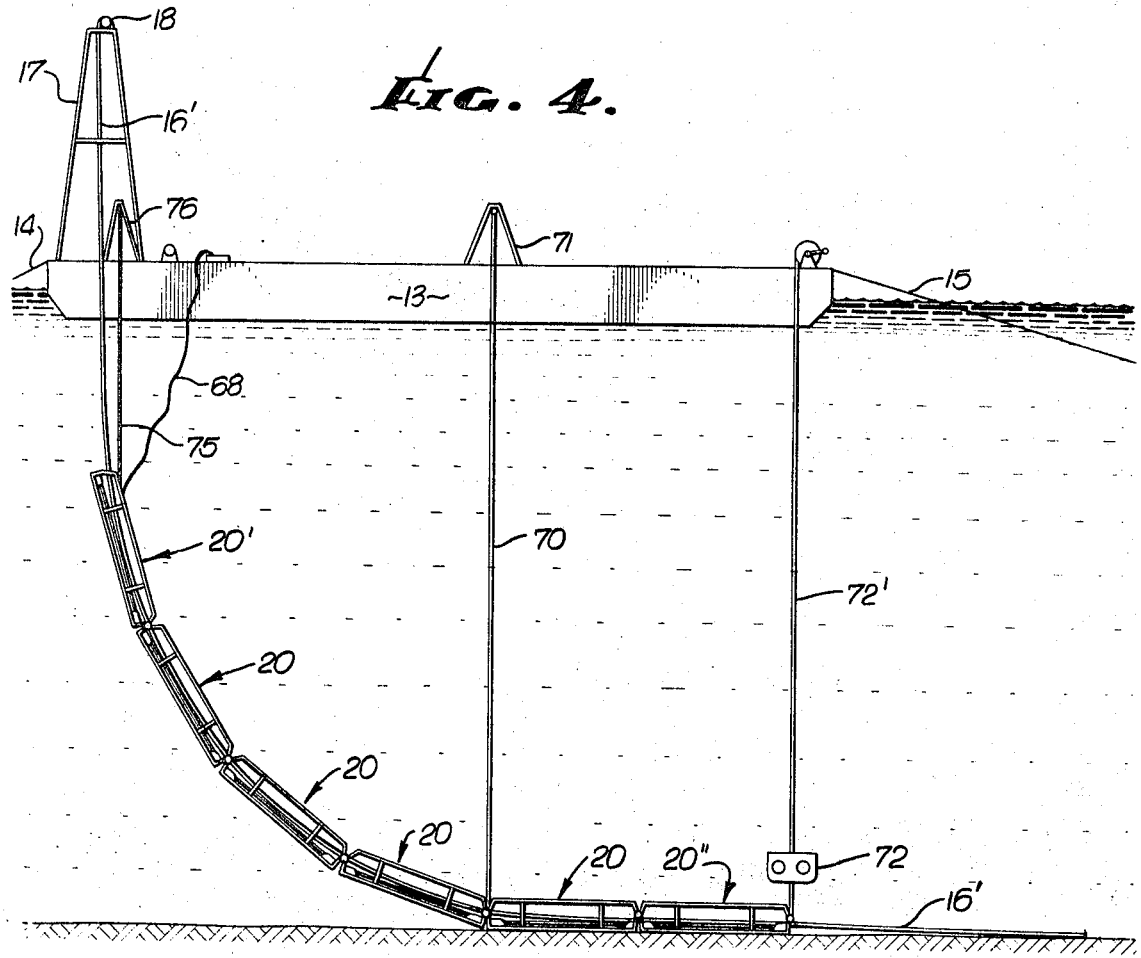
FIG. 4 is a schematic view similar to FIG. 1 showing the string of shoes set for laying pipes of different diameter at a shallower depth.

Under circumstances such as that illustrated in FIGS. 4 and 5, although all details of the structure are identical, a pipeline 16′ may be of smaller diameter such that a shorter string of shoes 20 can be employed, tilted to an effective pipeline radius which is smaller. Depending upon the length of the individual shoes 20, a lesser number can be employed than for the pipeline of larger pipeline diameter illustrated in FIG. 1. In the alternative, the endmost shoes may extend cantilever fashion adjoining the shoe 20″ in positions parallel to the bottom 11, the sling 70 may be attached to one of the shoes 20, as shown in FIG. 4, and the hoist 71 shifted forward on the barge toward the tower 17 so that the sling 70 is vertical. Under these circumstances a separate guide wire 72′ is used to guide the observation bell 72 to the endmost shoe 20″. Also the angle between adjoining shoes can be greater whereby to produce an effective radius of curvature of the pipeline smaller than that of FIG. 1. Changing the relative angular position of shoes with respect to each other is accomplished by the heretofore described hydraulic motor 62 and drives 50 provided as shown with left and right hand threads for line shaft 55, as illustrated in FIGS. 3 and 5; proper adjustments could be made to the drives 50 so that a preselected plurality of endmost shoes remain aligned parallel to the bottom 11 rather than at some relative angular position as would be the situation with the remaining string of shoes, as shown in FIG. 4.

While the invention has herein been shown and described in what is conceived to be a practical and effective embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A pipe laying apparatus for laying a pipeline beneath the surface of a body of water comprising in combination:
   (a) flotation means having connecting means for connecting pipe lengths to form a pipeline;
   (b) a plurality of aligned shoes for guiding said pipeline from said flotation means along a preselected curved path beneath the surface of said body of water,
   each shoe of said plurality of shoes being pivotally connected to an adjacent shoe whereby adjacent shoes may be angularly displaced,
   the shoe uppermost to said surface being located in an essentially vertical position while at least one shoe at the endmost location of said aligned plurality of shoes is located in an essentially horizontal position,
   (c) means connected to said flotation means and said plurality of shoes for adjustably supporting said plurality of shoes so that said uppermost shoe is maintained in the essentially vertical position and said one shoe is maintained in the essentially horizontal position,
   (d) means connected to said plurality of shoes for selectively changing the angular relationship between adjacent shoes,
   said adjustably supporting means including an adjustable sling connected at one end to said floatation means and at the other end to said one shoe in an essentially horizontal position.

2. An apparatus as claimed in claim 1 wherein said floatation means is a barge with said connecting means being at one location thereon and said adjustable sling being at another location thereon spaced from said first location.

3. An apparatus as claimed in claim 1 wherein said sling is connected to said endmost shoe.

4. An apparatus as claimed in claim 1 including an observation bell adapted to move along said sling.

5. A pipe line support assembly for guiding a pipeline comprising in combination:
   (a) a string of non-buoyant rigid open frames, the frame at the upper end being substantially vertical and the frame at the other end being substantially horizontal when in use,
   (b) means located at each end of each said frame acting at substantially the longitudinal centerline of said assembly pivotally connecting said frame to the next adjacent frame, each of said frames on opposite sides of said means being spaced from each other to implement pivotal movement in opposite directions whereby to effectively bend the assembly over a range of curvatures,
   (c) roller means, connected to each said frame intermediate the ends, for guiding and restraining said pipeline at a location where said roller means, said pipeline and said pivotally connecting means are substantially aligned in a direction parallel to the longitudinal axis of said frame, said roller means being positioned to contact said pipeline in at least three locations about the circumference of said pipeline to restrain said pipeline from lateral movement;
   (d) and adjustable means interconnecting adjacent ends of adjacent frames for moving said adjacent frames to positions of angular relationship pivotally relative to each other whereby to limit the radius of curvature of the pipeline while passing through the frames.

References Cited

UNITED STATES PATENTS

| | | | |
|---|---|---|---|
| 3,214,921 | 11/1965 | Goepfert et al. | 61—72.3 |
| 1,393,943 | 10/1921 | Chapman | 61—72.3 |
| 3,273,346 | 9/1966 | DeLaruelle et al. | 61—72.3 |
| 3,438,213 | 4/1969 | Broussard et al. | 61—72.3 |

FOREIGN PATENTS

| | | | |
|---|---|---|---|
| 1,269,182 | 7/1961 | France | 61—72.3 |

JACOB SHAPIRO, Primary Examiner